United States Patent
Chavala et al.

(10) Patent No.: US 11,670,939 B2
(45) Date of Patent: Jun. 6, 2023

(54) SHUTDOWN OF AUTOMATIC IGNITION CONTROLS UPON VALVE RELAY FAILURES

(71) Applicant: Carrier Corporation, Palm Beach Gardens, FL (US)

(72) Inventors: Venkata Narasimha Rao Chavala, Telangana (IN); Sudhir Raja Medepalli, Telangana (IN); Sowmya Paturu, Telangana (IN)

(73) Assignee: CARRIER CORPORATION, Palm Beach Gardens, FL (US)

( * ) Notice: Subject to any disclaimer, the term of this patent is extended or adjusted under 35 U.S.C. 154(b) by 356 days.

(21) Appl. No.: 16/987,763

(22) Filed: Aug. 7, 2020

(65) Prior Publication Data

US 2021/0057905 A1 Feb. 25, 2021

(30) Foreign Application Priority Data

Aug. 22, 2019 (IN) .............................. 201911033900

(51) Int. Cl.
| | |
|---|---|
| *H02H 7/00* | (2006.01) |
| *H02H 7/20* | (2006.01) |
| *F16K 31/02* | (2006.01) |
| *H01H 47/00* | (2006.01) |
| *H01H 47/22* | (2006.01) |

(52) U.S. Cl.
CPC ............... *H02H 7/20* (2013.01); *F16K 31/02* (2013.01); *H01H 47/002* (2013.01); *H01H 47/22* (2013.01)

(58) Field of Classification Search
None
See application file for complete search history.

(56) References Cited

U.S. PATENT DOCUMENTS

| 5,719,559 A | * | 2/1998 | Talbott ................. G05B 19/048 |
| | | | 714/49 |
| 2014/0300209 A1 | * | 10/2014 | Lorenz ..................... H02H 7/00 |
| | | | 307/115 |
| 2020/0355295 A1 | * | 11/2020 | Flandin ............... G01M 13/003 |

\* cited by examiner

*Primary Examiner* — Stephen W Jackson
(74) *Attorney, Agent, or Firm* — Cantor Colburn LLP

(57) ABSTRACT

A circuit and a method for shutdown of automatic ignition controls upon valve relay failures. One or more embodiments describe a method including controlling a power supply to a valve by a valve drive circuit, the valve drive circuit comprising a first relay coil and a second relay coil. The method also includes controlling the valve drive circuit by checking the first relay coil and the second relay coil and issue a drive signal to the first relay coil and the second relay coil. The method further includes protecting from accidental supply of power by a protection switch based on the drive signal issued by the controller.

18 Claims, 3 Drawing Sheets

US 11,670,939 B2

SHUTDOWN OF AUTOMATIC IGNITION CONTROLS UPON VALVE RELAY FAILURES

FOREIGN PRIORITY

This application claims priority to Indian Patent Application No. 201911033900, filed Aug. 22, 2019, and all the benefits accruing therefrom under 35 U.S.C. § 119, the contents of which in its entirety are herein incorporated by reference.

TECHNICAL FIELD OF INVENTION

The present invention relates generally to safety systems in industrial plants. More particularly, the invention relates to a circuit and a method for safe shutdown of automatic ignition controls upon valve relay failures.

BACKGROUND OF THE INVENTION

Generally, any appliance that utilizes gas for its functioning is provided with a gas control valve to regulate the pressure and the amount of gas supplied to the appliance for working. This is done to ensure safety of the user during operation of the appliance. In the current control systems known in the art, dual gas valve relay systems are present. If one relay fails to operate, the other one comes into play ensuring safe shutdown of the appliance. However, in case of failure of both the relays, the power is directly supplied to the gas valve making the gas valve ON without any command from a controller.

Although the current ignition control systems that are known in the art are able to detect failure of the relays conducting the power supply at the startup of the system, still they are unable to disconnect the power supply. Such a situation may lead to a disaster. Considering a scenario wherein the ignition control system is in a "power up" or "standby" mode and there is a failure of both the relays. In this case, the system is able to detect the relay failure but is unable to shut down the power supply to the gas valve. Consequently, the gas valve turns on which may lead to some mishappening. This is because even a transmission of power supply for a few seconds to the gas valve which may lead to explosion. Similarly, consider a scenario of "burn" mode. In this case, if the system is unable to detect the relay failures till next power up, again the system is unable to shut off the power of the gas valve. This leads to wastage of fuel and generation of unwanted heat and may also lead to an accident In view of the aforementioned problems, there is a need for a system and a method for developing ignition control that does not allow the power supply to gas valves even upon failure of both the relays thereby preventing any untoward happening. There is also a requirement of ensuring safety of the user as well as the surroundings while operation of any gas related appliance. In order to solve these problems, a circuit and a method are disclosed.

SUMMARY OF THE INVENTION

Various embodiments of the invention describe a circuit for safe shutdown of automatic ignition control upon valve relay failures. The invention discloses a failsafe circuit for safe shutdown of automatic ignition controls upon valve relay failures. The circuit comprises a valve drive circuit. The valve drive circuit comprises a first relay coil and a second relay coil configured to conduct power supply to a valve. The circuit also comprises a controller configured to control the valve drive circuit by checking the first relay coil and the second relay coil and issue a drive signal to the first relay coil and the second relay coil. The circuit further comprises a protection switch configured to control the power supply to the valve based on the drive signal issued by the controller.

In an embodiment of the invention, the controller provides the drive signal to drive the first relay coil and the second relay coil if the first relay coil and the second relay coil are in a working state and when the power supply is switched on.

In another embodiment of the invention, the protection switch provides protection from accidental transmission of the power supply when the first relay coil and the second relay coil are in a failed state.

In yet another embodiment of the invention, the controller provides the drive signal to the first relay coil and the second relay coil when the power supply is required to be conducted to the valve.

In still another embodiment of the invention, the first relay coil is associated with a first switch and the second relay coil is associated with a second switch.

In another different embodiment of the invention, the first relay coil and the second relay coil are checked by the controller on identifying proper contacts of the first switch and the second switch. In an embodiment of the invention, the protection switch is controlled by a switch drive signal which is further controlled by the drive signal from the controller.

In another embodiment of the invention, when the protection switch is in series with the valve and if the drive signal is disabled, the switch drive signal is also disabled.

In yet another embodiment of the invention, when the protection switch is in series with the valve and if the drive signal is enabled, the switch drive signal is also enabled to conduct the power supply to the valve.

In still another embodiment of the invention, when the protection switch is in parallel with the valve and if the drive signal is disabled, the switch drive signal is enabled and the power supply is bypassed by the protection switch and is not provided to the valve.

In an embodiment of the invention, when the protection switch is in parallel with the valve and if the drive signal is enabled, the switch drive signal is disabled and the protection switch remains open and the power supply is provided to the valve.

In another embodiment of the invention, the failure of the first relay coil and the second relay coil comprises conduction of power supply through the first switch and the second switch even when the first relay coil or the second coil relay are in an "off" state.

In yet another embodiment of the invention, the protection switch is a Metal Oxide Semiconductor Field Effect Transistor (MOSFET) switch, Insulated Gate Bipolar Transistor (IGBT) switch, or Silicon Controlled Rectifier (SCR) switch.

In an embodiment of the invention, a method is disclosed for safe shutdown of automatic ignition control upon valve relay failures. The method comprises conducting a power supply to a valve by a valve drive circuit. The valve drive circuit comprises a first relay coil and a second relay coil. The method further comprises controlling the valve drive circuit by checking the first relay coil and the second relay coil and issue a drive signal to the first relay coil and the second relay coil. The method also comprises protecting from accidental supply of power to the valve by a protection switch based on the drive signal issued by the controller.

In another embodiment of the invention, the protection switch is controlled by a switch drive signal which is further controlled by the drive signal to the first relay coil and the second relay coil from the controller.

In yet another embodiment of the invention, when the protection switch is in series with the valve and if the drive signal is disabled, the switch drive signal is also disabled.

In still another embodiment of the invention, when the protection switch is in series with the valve and if the drive signal is enabled, the switch drive signal is also enabled to conduct the power supply to the valve.

In another different embodiment of the invention, when the protection switch is in parallel with the valve and if the drive signal is disabled, the switch drive signal is enabled and the power supply is bypassed by the protection switch and is not provided to the valve.

In an embodiment of the invention, when the protection switch is in parallel with the valve and if the drive signal is enabled, the switch drive signal is disabled and the power supply is provided to the valve.

In another embodiment of the invention, the protection switch is a Metal Oxide Semiconductor Field Effect Transistor (MOSFET) switch, Insulated Gate Bipolar Transistor (IGBT) switch, or Silicon Controlled Rectifier (SCR) switch.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

Corresponding reference numerals indicate corresponding parts throughout the drawings.

DETAILED DESCRIPTION OF THE INVENTION

Described herein is the technology with a circuit and a method for safe shutdown of automatic ignition control upon valve relay failures. The circuit comprises a valve drive circuit comprising relay coils, a controller and a protection switch. Whenever there is a failure of both the valve relays, the failsafe circuitry isolates power from being conducted to the valve ensuring the valve closure.

As used herein, the relay coils may include, but not limited to, Direct Current (DC) relays, Alternate Current (AC) relays, Induction type relays, Magnetic latching relays, Reed relay coupled solid state relays (SSRs), Transformer coupled SSRs, Photo coupled SSRs, Hybrid relays or any other such electric component known in the art, that can be energized to conduct power supply.

As used herein, the controller may include, but not limited to, Programmable Logic Controllers (PLCs), Distributed Control Systems (DCS), Process Control Systems (PCS), Safety Control Systems (SCS) or any such other industrial controller well known in the art, that can control conduction of power supply to the valve.

As used herein, the protection switch may include, but not limited to, Single Pole Single Throw (SPST) switch, Single Pole Double Throw (SPDT) switch, Double Pole Single Throw (DPST) switch, Double Pole Double Throw (DPDT) switch, push button switch, toggle switch, limit switch, float switch, flow switch, joystick switch, rotary switch, bipolar transistors, power diode, Metal Oxide Semiconductor Field Effect Transistor (MOSFET), Insulated Gate Bipolar Transistor (IGBT), Silicon Controlled Rectifier (SCR), Triode AC (TRIAC), Diode AC (DIAC), Gate Turn-Off (GTO) Thyristor or the like.

Figure 1:
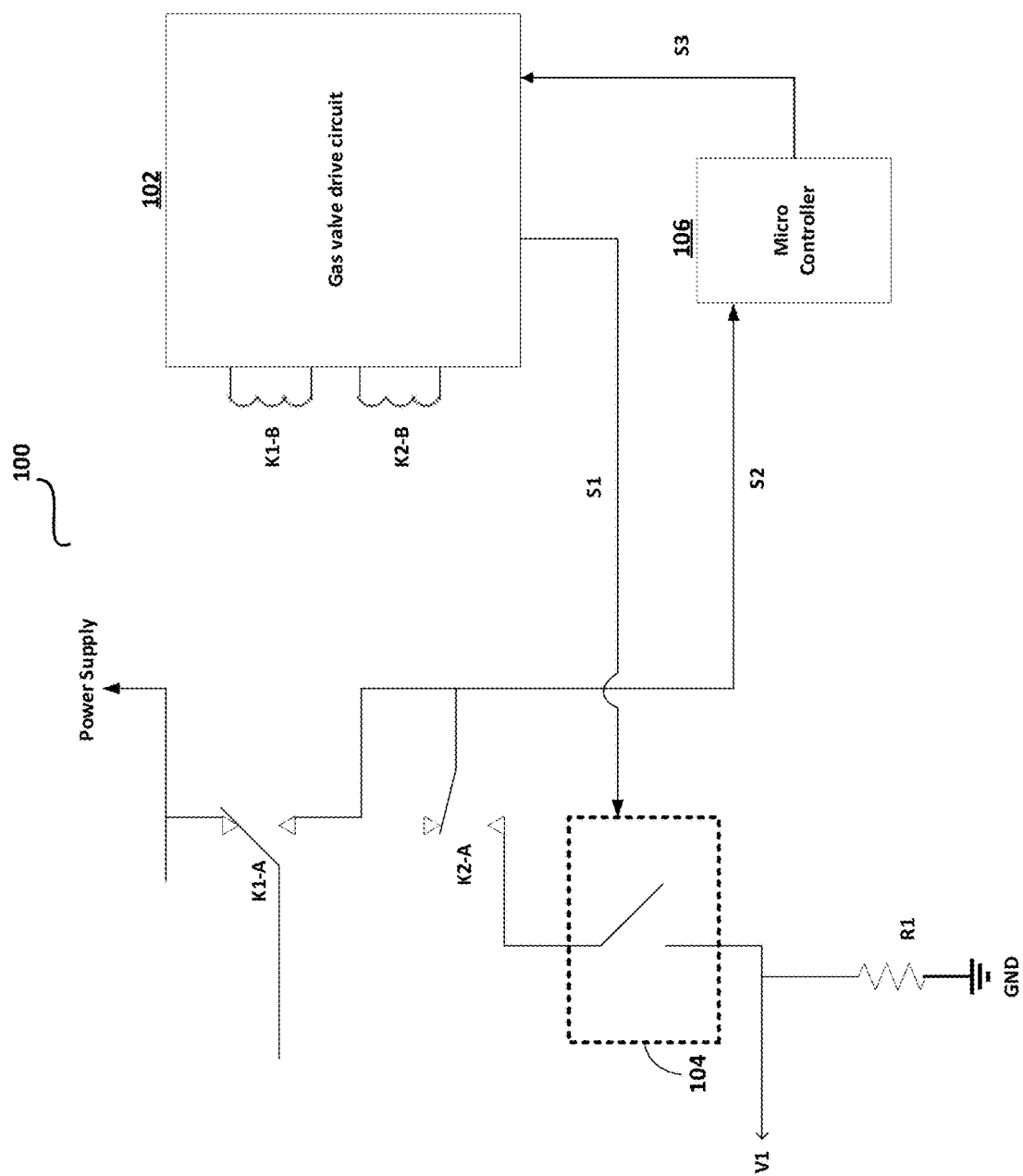
FIG. 1 is an exemplary circuit diagram in accordance with an exemplary embodiment of the invention.

FIG. 1 depicts an exemplary circuit diagram 100 for safe shutdown of automatic ignition controls upon valve relay failures. The circuit diagram comprises of a valve drive circuit 102, a controller 106 and a protection switch 104. The valve drive circuit may further comprise a first relay coil K1-B and a second relay coil K2-B that may be associated with a first switch K1-A and a second switch K2-A, respectively. The power supply may be connected to the ground GND through a resistance R1 as well as to the valve V1. The protection switch 104 may be connected in series with the valve V1 so that if the drive signal S3 is disabled, the switch drive signal S1 may also be disabled. On the other hand, if the drive signal S3 is enabled, the switch drive signal S1 may also be enabled to conduct the power supply to the valve V1. In an embodiment, the protection switch 104 may be a Metal Oxide Semiconductor Field Effect Transistor (MOSFET) switch.

When the power supply is required to be conducted to the valve V1, the controller 106 may first check the power supply (not shown) being supplied to the gas valve. The controller 106 may also check the first relay coil K1-B and the second relay coil K2-B by identifying proper contacts with the first switch K1-A and the second switch K2-A through the contact check signal S2. In an embodiment of the invention, the controller 106 may also check if the first relay coil and the second relay coils are working properly. When the power supply is available and the relay coils K1-B and K2-B are also in a working state, the controller 106 may be configured to control the valve drive circuit 102 by sending a drive signal S3 to the first relay coil K1-B and the second relay coil K2-B of the valve drive circuit 102. The valve drive circuit 102 may then send a switch drive signal S1 to activate the protection switch 104. The protection switch 104 provides protection from accidental transmission of the power supply when the first relay coil and the second relay coil are in a failed state, by closing down conduction of the power supply to the valve V1.

The switch drive signal S1 may work in synchronization with the valve drive circuit 102 so as to ensure that the switch drive signal S1 is in switched "on" state when the valve drive circuit 102 is in switched "on" mode and the switch drive signal S1 is in switched "off" state when the valve drive circuit 102 is in switched "off" mode.

If there is a failure of relays so that the conduction of power supply through the first switch K1-A and the second switch K2-A may occur even when the first relay coil K1-B and the second relay coil K2-B may be in an "off" state. In an embodiment of the invention, when there is such a valve relay failure and the ignition control goes to safety shutdown, the controller 106 may detect the failure and may switch "off" the drive signal S3 to the valve drive circuit 102. The valve drive circuit 102 may not send the switch drive signal S1 to the protection switch 104. As a consequence, the protection switch 104 may remain open cutting off the power supply to the valve V1 ensuring that the power to the valve drive circuit 102 is provided only when relays are in good working condition. Further, this may also ensure that the relays are properly driven by the drive signal S3.

In an exemplary embodiment of the invention, the ignition control may be in a "standby" or "power up" mode wherein both the relays may be in good working condition or there may be a failure of one or both the relays. In such a scenario, drive signal S3 may not be sent to the valve drive circuit 102 and the protection switch 104 may not be activated. The power supply may not be supplied to the valve V1 ensuring closure of the valve V1.

In another exemplary embodiment of the invention, the ignition controls may be in "Standby Mode" or "Post Purge Mode" mode upon removal of call for heat wherein both the relays may be in good working condition or there may be a failure of one or both the relays. In such scenarios, drive signal S3 may not be sent to the valve drive circuit 102 due to which the protection switch 104 may remain opened leading to the closure of valve V1.

In yet another exemplary embodiment of the invention, the ignition controls may be in "burn" mode where call for heat is still present. Considering a scenario wherein both the relays may be in good working condition or there may be a failure of one or both the relays; the power supply to the valve V1 may continue causing the valve V1 to remain open.

Figure 2:
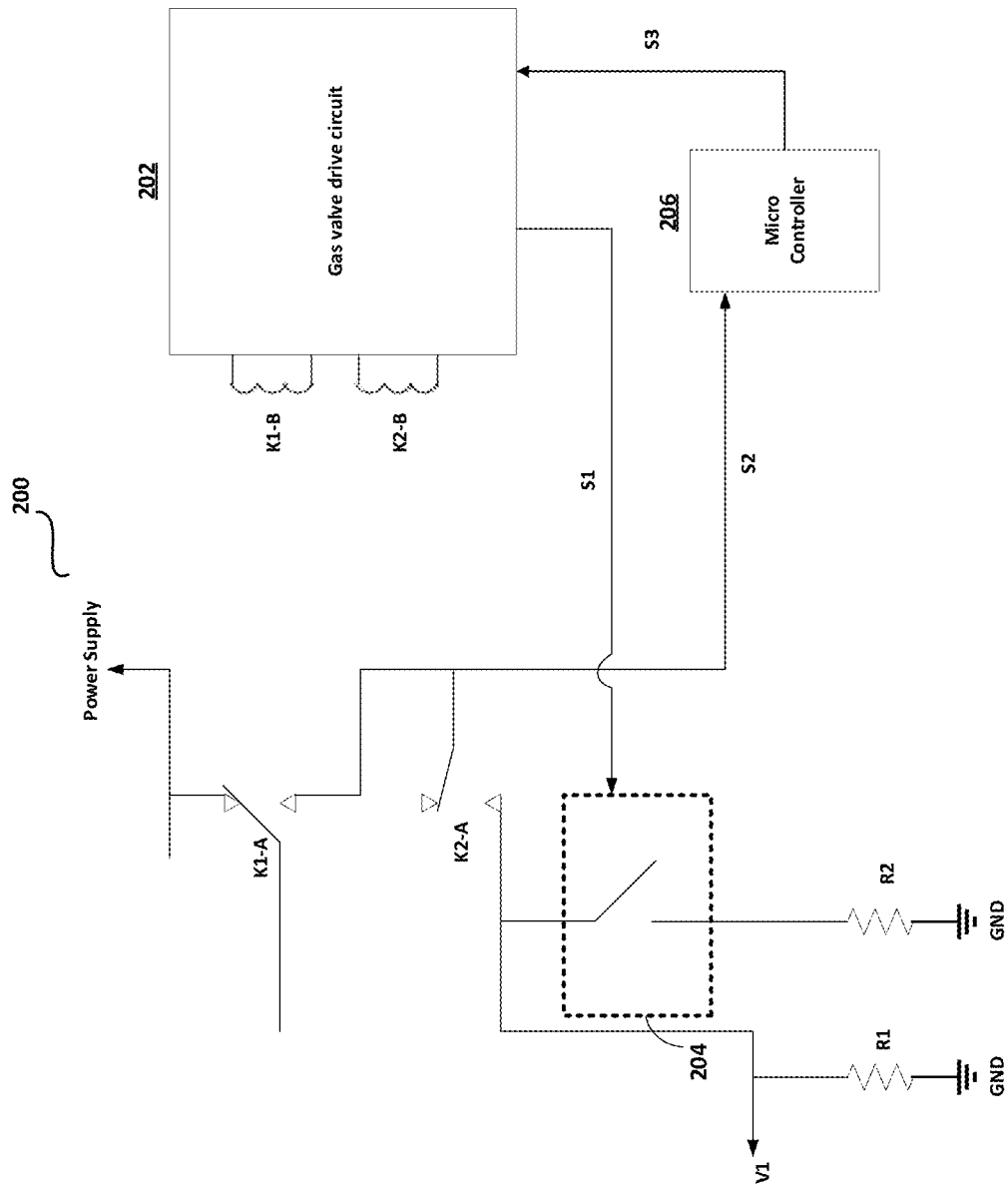
FIG. 2 is another exemplary circuit diagram in accordance with another exemplary embodiment of the invention.

FIG. 2 depicts an exemplary circuit diagram 200 for safe shutdown of automatic ignition controls upon valve relay failures. The circuit diagram comprises of a valve drive circuit 202, a microcontroller 206 and a protection switch 204. The valve drive circuit may further comprise of a first relay coil K1-B and a second relay coil K2-B that may be associated with a first switch K1-A and a second switch K2-A, respectively. The power supply may be connected to the ground GND through resistances R1 and R2 as well as to the valve V1. The protection switch 204 may be connected in parallel with the valve V1.

The switch drive signal S1 may work in opposition with the valve drive circuit 202 so that the switch drive signal S1 may be switched "off" when the valve drive circuit 202 is in a switched "on" mode and vice-versa. When the drive signal S3 may be in the switched "on" mode, the protection switch 204 may not be activated causing the protection switch 204 to remain open. The power supply may then be directed to the valve.

When there is a relay failure and both the relays fail, the control goes to safety shutdown, the controller 206 may detect the relay failure and may switch "off" the drive signal S3 to the valve drive circuit 202. The valve drive circuit 202 may send Low Signal to the switch drive signal S1, thereby activating the protection switch 204. The protection switch 204 on activation may close down and shunts the power supply path. The power supply is directly bypassed to ground GND through resistance R2 thereby cutting off the power supply to the valve V1. In other words, the power supply from the failed relay may be bypassed through the protection switch 204 ensuring that the power to the valve is provided only when the relays are in good working condition. Further, this may also confirm that the relays are properly driven by the drive signal S3. It is to be noted that value of resistance R2 is very small compared to resistance RE Alternatively, when S1 is low and the protection switch is closed, the path through resistance R2 is shorted to bypass the power supply.

In case if the power supply is conducted and the first relay coil and the second relay coil are in working condition, the controller 206 will enable the drive signal S3 to energize the first relay coil and the second relay coil. The valve drive circuit 202 may send High Signal to the switch drive signal S1, thereby de-activating the protection switch 204, and it remains Open. As such, the power supply would be conducted directly to the valve.

Figure 3:
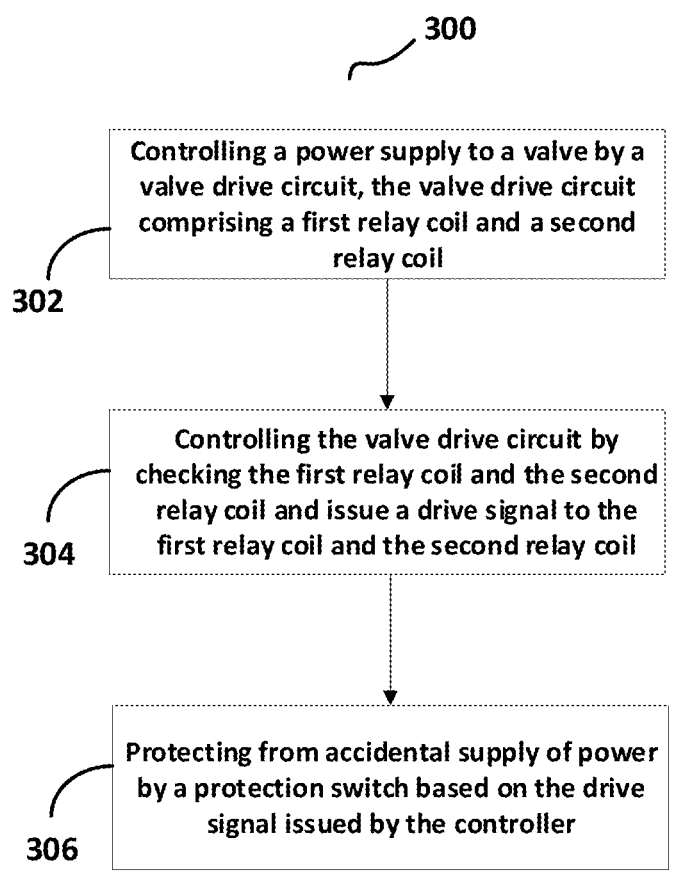
FIG. 3 is an exemplary flowchart illustrating a method to perform the invention according to an exemplary embodiment of the invention.

FIG. 3 depicts a flowchart illustrating a method to perform the invention according to an exemplary embodiment of the invention. The method flowchart 300 describes a method being performed for enabling the invention. The method flowchart 300 may start at step 302.

At step 302, the micro controller 106 may control power supply to a valve V1 by a valve drive circuit 102, the valve drive circuit 102 comprising of a first relay coil K1-B and a second relay coil K2-B.

At step 304, the microcontroller 106 may control the valve drive circuit 102 by checking the first relay coil K1-B and the second relay coil K2-B. The microcontroller 106 may then issue a drive signal S3 to the first relay coil K1-B and the second relay coil K2-B.

At step 306, the circuit 100 may protect the valve V1 from accidental supply of power by use of a protection switch 104. The mechanism of protection may be based on the drive signal S3 issued by the microcontroller 106.

The present invention is applicable to any electrical appliance, machine, apparatus, or any other such device known in the art having valves.

The present invention provides the following technical advantages over the existing safety mechanisms present in various appliances: a) safely shuts down the valve by isolating the power supply to the valve even if both the relays fail; b) eliminates the need of redundant valves; c) Handles relay failure scenarios effectively to provide for safe shutdown of power to the valve; and d) saves cost.

The embodiments of the invention discussed herein are exemplary and various modification and alterations to a person skilled in the art are within the scope of the invention.

The order of execution or performance of the operations in examples of the invention illustrated and described herein is not essential, unless otherwise specified. That is, the operations may be performed in any order, unless otherwise specified, and examples of the invention may include additional or fewer operations than those disclosed herein. For example, it is contemplated that executing or performing a particular operation before, contemporaneously with, or after another operation is within the scope of aspects of the invention.

When introducing elements of aspects of the invention or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of."

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A circuit comprising:
    a valve drive circuit comprising a first relay coil and a second relay coil configured to conduct power supply to a valve;
    a controller configured to control the valve drive circuit by checking the first relay coil and the second relay coil and issue a drive signal to the first relay coil and the second relay coil; and
    a protection switch configured to control the power supply to the valve based on the drive signal issued by the controller;
    wherein the protection switch provides protection from accidental transmission of the power supply when the first relay coil and the second relay coil are in a failed state.

2. The circuit of claim 1, wherein the controller provides the drive signal to drive the first relay coil and the second relay coil if the first relay coil and the second relay coil are in a working state and when the power supply is switched on.

3. The circuit of claim 1, wherein the controller provides the drive signal to the first relay coil and the second relay coil when the power supply is required to be conducted to the valve.

4. The circuit of claim 1, wherein the first relay coil is associated with a first switch and the second relay coil is associated with a second switch.

5. The circuit of claim 4, wherein the first relay coil and the second relay coil are checked by the controller on identifying proper contacts of the first switch and the second switch.

6. A circuit comprising:
    a valve drive circuit comprising a first relay coil and a second relay coil configured to conduct power supply to a valve;
    a controller configured to control the valve drive circuit by checking the first relay coil and the second relay coil and issue a drive signal to the first relay coil and the second relay coil; and
    a protection switch configured to control the power supply to the valve based on the drive signal issued by the controller;
    wherein the protection switch is controlled by a switch drive signal which is further controlled by the drive signal from the controller.

7. The circuit of claim 6, wherein when the protection switch is in series with the valve and if the drive signal is disabled, the switch drive signal is also disabled.

8. The circuit of claim 6, wherein when the protection switch is in series with the valve and if the drive signal is enabled, the switch drive signal is also enabled to conduct the power supply to the valve.

9. The circuit of claim 6, wherein when the protection switch is in parallel with the valve and if the drive signal is disabled, the switch drive signal is enabled and the power supply is bypassed by the protection switch and is not provided to the valve.

10. The circuit of claim 6, wherein when the protection switch is in parallel with the valve and if the drive signal is enabled, the switch drive signal is disabled and the protection switch remains open and the power supply is provided to the valve.

11. The circuit of claim 6, wherein the failure of the first relay coil and the second relay coil comprises conduction of power supply through the first switch and the second switch even when the first relay coil or the second relay coil are in an off state.

12. The circuit of claim 1, wherein the protection switch is a Metal Oxide Semiconductor Field Effect Transistor (MOSFET) switch, Insulated Gate Bipolar Transistor (IGBT) switch, or Silicon Controlled Rectifier (SCR) switch.

13. A method comprising
    conducting a power supply to a valve by a valve drive circuit, the valve drive circuit comprising a first relay coil and a second relay coil;
    controlling the valve drive circuit by checking the first relay coil and the second relay coil and issue a drive signal to the first relay coil and the second relay coil; and
    protecting from accidental supply of power to the valve by a protection switch based on the drive signal issued by the controller;
    wherein the protection switch is controlled by a switch drive signal which is further controlled by the drive signal to the first relay coil and the second relay coil from the controller.

14. The method of claim 13, wherein when the protection switch is in series with the valve and if the drive signal is disabled, the switch drive signal is also disabled.

15. The method of claim 13, wherein when the protection switch is in series with the valve and if the drive signal is enabled, the switch drive signal is also enabled to conduct the power supply to the valve.

16. The method of claim 13, wherein when the protection switch is in parallel with the valve and if the drive signal is disabled, the switch drive signal is enabled and the power supply is bypassed by the protection switch and is not provided to the valve.

17. The method of claim 13, wherein when the protection switch is in parallel with the valve and if the drive signal is enabled, the switch drive signal is disabled and the power supply is provided to the valve.

18. A method comprising
    conducting a power supply to a valve by a valve drive circuit, the valve drive circuit comprising a first relay coil and a second relay coil;
    controlling the valve drive circuit by checking the first relay coil and the second relay coil and issue a drive signal to the first relay coil and the second relay coil; and
    protecting from accidental supply of power to the valve by a protection switch based on the drive signal issued by the controller;
    wherein the protection switch is a Metal Oxide Semiconductor Field Effect Transistor (MOSFET) switch Insulated Gate Bipolar Transistor (IGBT) switch, or Silicon Controlled Rectifier (SCR) switch.

* * * * *